UNITED STATES PATENT OFFICE.

SAMUEL C. DAVIDSON, OF BELFAST, IRELAND.

PREPARATION OF VEGETABLE INFUSIONS, EXTRACTS, &c.

SPECIFICATION forming part of Letters Patent No. 243,521, dated June 28, 1881.

Application filed February 8, 1881. (No specimens.) Patented in England July 24, 1880.

*To all whom it may concern:*

Be it known that I, SAMUEL CLELAND DAVIDSON, of Belfast, Ireland, merchant, have invented certain new and useful Improvements in and in the Preparation of Certain Vegetable Infusions, Extracts, or Essences, of which the following is a specification.

The improvements relate to aqueous infusions or extracts of tea, coffee, and cocoa. These infusions or extracts, when prepared according to the ordinary method, have when cold a clouded and turbid or muddy appearance, and are also prone to decomposition and decay if kept for any length of time; but when prepared as hereinafter described, they have an attractive purity and brightness of appearance, even when perfectly cold. They retain their proper amber or ruby color or tint, the delicacy of their flavors remains undiminished and unaltered, and they will keep in perfectly good condition for a considerable, if not for an indefinite, period, and they are thus suitable to be used as essences for admixture with water to produce particular drinks or beverages. They may, for instance, if prepared to a sufficient strength, be combined with water charged with carbonic-acid gas, so as to form aerated beverages of the particular essence or infusion used, and may be bottled and retained available for use as required, in the same manner that sirups are ordinarily used in the dispensing of other aerated beverages. They can also be used with ordinary water as essences or sirups, and if a suitable quantity of the same be put into a cup or tumbler and hot or cold water be poured upon it a hot or cold beverage of the particular infusion or essence used is obtained in a convenient and expeditious manner.

My improved infusions or essences are prepared as follows:

An aqueous infusion of the tea, coffee, or cocoa is made of about four times the strength that it is intended to be when prepared into a drink or beverage by admixture of water, and it is then allowed to cool. When cold it will usually have a very turbid or clouded and muddy appearance, which, in a beverage, would be exceedingly undesirable. This turbidity is difficult to remove by any ordinary process of filtration; and part of my improvements in the preparation of these infusions or essences of tea, coffee, and cocoa consists in the removal of this objectionable turbid appearance without appreciably altering or diminishing the strength and flavor of the infusion. For this purpose I add to the cold and turbid-looking infusion an amount of glycerine equal to about the weight of dry tea used in making the infusion and equal to about half the weight of the dry coffee and cocoa, and I then further add hydrate of alumina, preferably some of that gelatinous precipitate known as "trihydrate of alumina," thoroughly mixing the same with the infusion, and then removing the trihydrate by filtration through either cloth, paper, or other convenient filter of sufficient degree of fineness to catch and retain it, or it may, in some instances, be removed by decantation. It is also suitable, when preferred, to have the glycerine and trihydrate of alumina mixed together, as it is a convenient method of keeping the trihydrate, and they may then be added to the infusion in combination. On removal of the trihydrate of alumina the liquid should be left pure and bright.

The quantity of the trihydrate of alumina to be used depends so entirely upon the strength of the infusion or extract with which it is employed that it would be difficult to define accurately an exact proportion for it, but it should be added carefully till the liquid filters out sufficiently clarified and pure. I preferably employ it with the liquids when they are cold and filter it from them again at the same temperature, so that it is an easy matter to keep adding the trihydrate of alumina until the liquids come through the filter clear enough.

The trihydrate of alumina which I preferably employ is that which is prepared by precipitation from a solution of alum by adding thereto an alkaline carbonate until the solution is neutralized or until it shows just slightly alkaline to test-paper. The precipitated hydrate of alumina should then be filtered out, but the filtrate need not necessarily be washed, and it should be used in the moist state and without allowing it to become dried; and I find that for practical use it is generally desirable to mix it with about an equal bulk of glycerine, which is approximately about the proportion in which they should be used for clarification of the infusions, and in this condition can be retained and used when required. If the trihydrate be used alone and entirely without the glycerine, either in combination or separately added, it is capable of effecting the clarification of the infusions, but the resulting liquid is comparatively inferior in strength and quality. Again, the glycerine may be used alone and will effect a partial clarification of the liquid, but the glycerine and the tryhydrate combined give the most perfect result.

Hydrated alumina prepared in other ways than that described—such, for instance, as by precipitation from solution of aluminate of soda—will effect the clarification of the before-mentioned infusions if employed as already described; but I find that unless prepared as first described—viz., by precipitation from solution of alum—the trihydrate is not so satisfactory in its operation.

The sweetening of the infusions, extracts, or essences with sugar should be done prior to the process of clarification with the trihydrate of alumina, and any other suitable flavoring-matters may at the same time be added, provided such flavoring-matters are not of a nature to render the trihydrate of alumina soluble. To the clarified essence or infusion I then add glycerine, in which is dissolved salicylic acid in the ratio of about eight grains of salicylic acid to the ounce of glycerine, and of this compound of glycerine and salicylic acid I add an amount equal to about the weight of the dry tea used in making the infusion or extract and to about half the weight of the dry coffee or cocoa employed and stir the same into the infusion or essence, after which it will generally be found advantageous to raise the infusion to boiling-point for a few minutes, and when cooled it is complete and ready for use; but care should be taken to prevent dust or other impurities getting into the liquid thereafter.

I am aware that salicylic acid is a well-known antiseptic, and that it has been employed in connection with water and glycerine to preserve meat; and I am also aware that the property possessed by trihydrate of alumina, which enables it to carry down the coloring-matter of vegetable solutions, is well known. Therefore I claim neither of these.

What I claim, and desire to secure by Letters Patent, is—

1. The improvement in the manufacture of infusions, extracts, or essences of tea, coffee, and cocoa which consists in treating them with sugar, trihydrate of alumina, glycerine, and salicylic acid, whereby they are rendered bright and transparent and possess their natural tints or colors, and are capable of remaining for an indefinite period without alteration or decomposition, substantially as set forth.

2. As a new product, a clarified and preserved infusion or extract of tea, coffee, and cocoa, prepared as herein set forth.

In witness whereof I have hereunto signed my name in the presence of two subscribing witnesses.

SAMUEL C. DAVIDSON.

Witnesses:
  JOHN C. MEWBURN,
  GEORGE C. BACON.